United States Patent
Huth et al.

(10) Patent No.: US 10,757,119 B2
(45) Date of Patent: Aug. 25, 2020

(54) METHOD FOR PROTECTING A NETWORK AGAINST A CYBERATTACK

(71) Applicant: Robert Bosch GmbH, Stuttgart (DE)

(72) Inventors: Christopher Huth, Leonberg (DE); Clemens Schroff, Kraichtal (DE); Herve Seudie, Moensheim (DE); Marcel Kneib, Mainhardt (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 15/968,102

(22) Filed: May 1, 2018

(65) Prior Publication Data
US 2018/0337934 A1 Nov. 22, 2018

(30) Foreign Application Priority Data
May 19, 2017 (DE) .................. 10 2017 208 553

(51) Int. Cl.
*H04L 29/06* (2006.01)
*H04W 4/48* (2018.01)
(Continued)

(52) U.S. Cl.
CPC .......... *H04L 63/1416* (2013.01); *H04L 12/40* (2013.01); *H04L 63/1425* (2013.01);
(Continued)

(58) Field of Classification Search
CPC ..... H04L 2012/40215; H04L 63/1416; H04W 4/48
See application file for complete search history.

(56) References Cited

U.S. PATENT DOCUMENTS 9,843,597 B2 * 12/2017 Allouche ............ H04L 63/1416
10,193,903 B1 * 1/2019 Bajpai ................. H04L 63/1425
(Continued)

FOREIGN PATENT DOCUMENTS

EP 2433457 A2 3/2012
WO 2012159940 A2 11/2012

OTHER PUBLICATIONS

Cho, K.T. and Shin, K.G., 2016. Fingerprinting electronic control units for vehicle intrusion detection. In 25th {USENIX} Security Symposium ({USENIX} Security 16) (pp. 911-927). (Year: 2016).*
(Continued)

*Primary Examiner* — James R Turchen
(74) *Attorney, Agent, or Firm* — Norton Rose Fulbright US LLP; Gerard Messina

(57) ABSTRACT

A method for protecting a network having multiple network subscribers against a cyberattack, in which bits or bit sequences of a message are transmitted between the network subscribers in the network via different voltage levels on at least one transmission route of the network. For this purpose, at least one characteristic of the voltage levels or of the transmitted bits or bit sequences is actively modified in at least one of the network subscribers or on the at least one transmission route and the origin of the transmitted bits or of the at least one transmission route is determined on the basis of the at least one characteristic. The cyberattack on the network is detected or the cyberattack on the network is localized in the network as a function of the ascertained origin.

17 Claims, 8 Drawing Sheets

(51) Int. Cl.
   *H04L 12/40* (2006.01)
   *H04W 4/40* (2018.01)
(52) U.S. Cl.
   CPC ...... *H04L 63/1441* (2013.01); *H04L 63/1466* (2013.01); *H04W 4/48* (2018.02); *H04L 2012/40215* (2013.01); *H04L 2012/40273* (2013.01); *H04L 2463/146* (2013.01); *H04W 4/40* (2018.02)

(56) References Cited

U.S. PATENT DOCUMENTS

| | | | |
|---|---|---|---|
| 2008/0186870 A1* | 8/2008 | Butts | H04L 43/0847 370/252 |
| 2015/0113638 A1* | 4/2015 | Valasek | G06F 21/562 726/22 |
| 2015/0258999 A1* | 9/2015 | Jiang | B60W 50/029 701/29.2 |
| 2016/0188396 A1* | 6/2016 | Sonalker | G06F 11/0739 714/37 |
| 2016/0197944 A1* | 7/2016 | Allouche | H04L 63/1466 726/23 |
| 2017/0118038 A1* | 4/2017 | Ujiie | H04L 12/40169 |
| 2017/0286675 A1* | 10/2017 | Shin | H04L 63/0876 |
| 2018/0196941 A1* | 7/2018 | Ruvio | H04L 63/1425 |
| 2018/0241584 A1* | 8/2018 | Ruvio | H04L 12/40013 |
| 2018/0270196 A1* | 9/2018 | Bathurst | H04L 63/14 |
| 2019/0245872 A1* | 8/2019 | Shin | H04L 63/1425 |

OTHER PUBLICATIONS

Choi, W., Jo, H.J., Woo, S., Chun, J.Y., Park, J. and Lee, D.H., 2018. Identifying ecus using inimitable characteristics of signals in controller area networks. IEEE Transactions on Vehicular Technology, 67(6), pp. 4757-4770. (Year: 2018).*

Avatefipour, O., Hafeez, A., Tayyab, M. and Malik, H., Dec. 2017. Linking received packet to the transmitter through physical-fingerprinting of controller area network. In 2017 IEEE Workshop on Information Forensics and Security (WIFS) (pp. 1-6). IEEE. (Year: 2017).*

Choi, W., Joo, K., Jo, H.J., Park, M.C. and Lee, D.H., 2018. Voltageids: Low-level communication characteristics for automotive intrusion detection system. IEEE Transactions on Information Forensics and Security, 13(8), pp. 2114-2129. (Year: 2018).*

Murvay, P.S. and Groza, B., 2014. Source identification using signal characteristics in controller area networks. IEEE Signal Processing Letters, 21(4), pp. 395-399. (Year: 2014).*

* cited by examiner

METHOD FOR PROTECTING A NETWORK AGAINST A CYBERATTACK

RELATED APPLICATION INFORMATION

The present application claims priority to and the benefit of German patent application no. 10 2017 208 553.3, which was filed in Germany on May 19, 2017, the disclosure which is incorporated herein by reference.

FIELD OF THE INVENTION

A method is provided for protecting a network against a cyberattack as well as network subscribers equipped for this purpose and a computer program equipped for this purpose.

BACKGROUND INFORMATION

A method from WO2012/159940 A2 uses a fingerprint for characterizing a vehicle network in order to be able to ascertain a manipulation of the vehicle network. The fingerprint for this purpose is obtained in particular from a network configuration.

Patent document EP 2 433 457 B1 discusses a security system for vehicles as well as methods for intrusion detection as well as measures for reaction in the event that a respective cyberattack is ascertained.

SUMMARY OF THE INVENTION

Methods are provided, which increase the protection of a network by making it possible to detect a cyberattack on the network on the basis of a transmission in the network or to localize a detected attack. For this purpose, properties of the voltage levels of the transmission or of the times or shapes of bits or bit sequences are actively manipulated or modified in message transmissions in such a way that characteristic identification marks for the transmitting network subscriber or a transmission route used for the transmission are thereby introduced. It is thus possible to embed a characteristic (digital) fingerprint into the signal of a transmission. Through measurements other network subscribers are able to determine from this the origin of a message. It is thus possible to identify and/or localize cyberattacks.

No additional data transmissions in the network are required for the method, the method may be run alongside the regular useful data transmission. The method thus also has no negative effect on real-time requirements in the network.

An external attacker is hardly able to imitate or manipulate the modifications or characteristics thus introduced, whereby the method increases the protection against cyberattacks by specific countermeasures or reactions that are difficult to neutralize.

Because modifications are introduced actively and in a targeted manner, these can be particularly pronounced so that they allow for a characteristic assignment to a network subscriber or a transmission route. In addition, however, it is also possible specifically to bring about a modification which does not yet trigger an error detection of message contents, e.g. by erroneously scanned bits. In the event of random fluctuations of characteristics of a transmission, by contrast, there is the danger that they are either not sufficiently significant or already jeopardize a correct detection of the transmitted content.

The modifications or modified characteristics introduced may be a magnitude of the voltage levels, a transmission time of at least an edge of the transmitted bit or the transmitted bit sequences or a shape of at least one edge of the transmitted bit, in particular by inserting steps in the at least one edge. Additionally or alternatively, it is also possible to modify actively and in a targeted manner a clock speed or baud rate for the transmitted bits or bit sequences. Furthermore, it is also possible to use a modified working cycle and/or rest cycle for the transmitted bits or bit sequences as a characteristic.

The method may be used particularly advantageously in a CAN bus system, e.g. in a vehicle network. In such a system, modifications may occur only in the signal on the CAN high conductor, only in the signal on the CAN low conductor or on both conductors. In the latter case, the modifications may be configured in such a way that the differential CAN signal is not affected by the modifications.

The modifications may be performed in the network in the at least one network subscriber in a communication controller of the network subscriber, in a transceiver of the network subscriber, in a bus circuit (e.g. termination or filter) of the network subscriber, in a microcontroller of the network subscriber or in a signal processor of the network subscriber. Additionally or alternatively, modifications may also be introduced on transmission routes of the network.

In a particular development, following a detected cyberattack, reactions or countermeasures are initiated, e.g. a termination of the transmission of the message, an identification of the message as invalid, an exclusion of the localized point of attack from the network, a deactivation of a gateway of the network, in order to cut off a localized point of attack of the network from other parts of the network, or a transmission of a warning message about the detected manipulation. If these reactions or countermeasures are chosen as a function of the localized point of attack on the network, they may be applied in a more targeted manner and therefore with increased chances of success.

In addition to the provided method, computer programs equipped for the purpose and network subscribers equipped for this purpose are also provided.

The present invention is described in more detail below with reference to the appended drawings and on the basis of exemplary embodiments.

DETAILED DESCRIPTION

The present invention relates to a method for protecting a network against a cyberattack by detecting the attack or localizing a point of attack of such a cyberattack in the network.

The security of networks in general and specifically of networks in vehicles against cyberattacks is becoming more and more important. Such attacks are becoming more relevant especially for networked and automated vehicles. Researchers were able to demonstrate successful remote attacks on vehicle control units. This makes it possible for attackers to take over control functions in the vehicle in that messages are input into a vehicle network via the successfully attacked control units.

On the one hand, it is important to detect an attack on a network and to identify the harmful messages input in the process. On the other hand, it is also important to identify the origin of the attack, that is, the attacked network subscriber or at least the attacked network segment, inter alia in order to be able to initiate specific countermeasures. If a message is identified as malicious, then it is possible to detect, on the basis of characteristics of the transmission of the message, from which network subscriber or from which network segment the message originates.

For this purpose, in the event of message transmissions between network subscribers, the transmitted bits or bit sequences of messages are actively modified, e.g. in the time characteristic and/or on the basis of their voltage levels, in such a way that the bits or bit sequences are characteristic for the transmitting network subscriber or for an affected transmission route.

Figure 1:
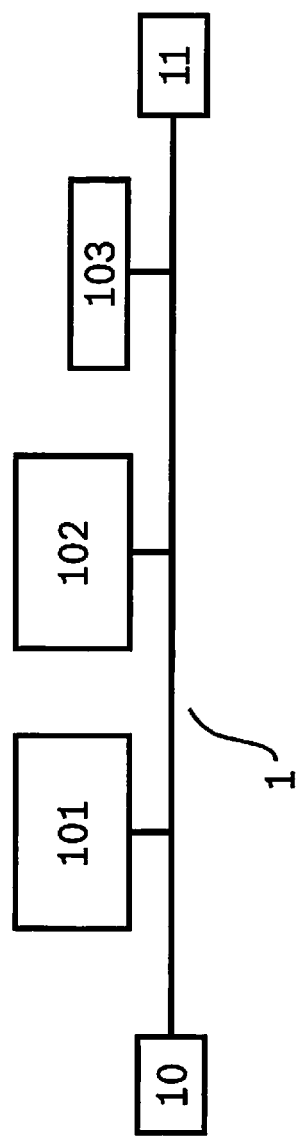
FIG. 1 shows an exemplary network having multiple network subscribers in a schematic representation.

FIG. 1 shows an exemplary network having terminal resistors 10 and 11. An ECU 101, an ECU 102 and a network monitor or network monitoring unit 103 are connected to bus 1 as network subscribers. Both the network subscribers 101 and 102 as well as the network monitor 103 have transmitting and a receiving arrangement to be able to receive messages of bus 1 and to transmit messages to bus 1. They also have an evaluating arrangement for determining characteristics of voltage levels, bits or bit sequences of a transmission of a message on the bus as well as a processing unit or hardware circuit in order to ascertain from this an origin of the message, in particular by comparison with predetermined data, or to perform an assignment of the message.

On the basis of the characteristic modification of the bits or bit sequences, which is used in a transmitting network subscriber or in an involved transmission route for all transmissions, the other network subscribers are able to determine the origin of the transmitted bit or the transmitted bit sequence. For this purpose, the network subscribers are able either to learn the particular characteristics or access a stored association between characteristics and corresponding network subscribers, which was stored or learned in advance, for example. By comparison with measured characteristics of a transmission, it is possible to ascertain their origin in a network subscriber or their transmission via a specific transmission route in the network. As a function of the determined origin, it is then possible to detect e.g. a cyberattack on the network (e.g. if a content or transmission time of a message does not match the transmitting network subscriber or the involved transmission route). Alternatively or additionally, it is thus also possible to localize in the network a detected cyberattack on the network. In the first case, the cyberattack may also be detected via corresponding methods from the related art.

Actively introducing the characteristics ensures that these are sufficiently characteristic and distinguishing for the network subscribers. It is therefore possible to select the modifications to be so pronounced that the transmitting network subscribers or involved transmission routes are reliable detected by other network subscribers. On the other hand, the modifications may also be selected in such a way that there are no negative effects on the contents of the messages that are to be transmitted, e.g. due to erroneously detected bits or bit sequences.

The active introduction may be performed by appropriate hardware selection or hardware manipulation, but also by software modifications.

Exemplary modifications include: a bit level, i.e. a magnitude of the utilized voltage of bits, shifted times for the transmission of edges, i.e. modified bit widths, a modified clock speed or baud rate for the transmitted bits or bit sequences, a modification of the working cycle of the transmission as well as stepped edges of the transmitted bits.

Figure 2:
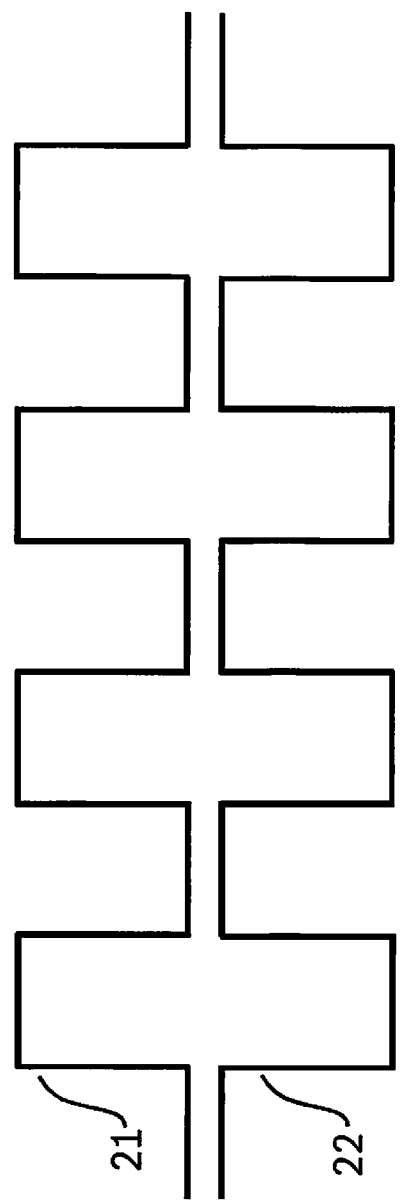
FIG. 2 shows an exemplary bit sequence without active modifications.

FIG. 2 shows a schematic representation of a bit sequence of a CAN communication as an example of an unmodified communication. Bit sequence 21 corresponds to a transmission on the CAN high conductor, while bit sequence 22 corresponds to a transmission on the CAN low conductor.

Figure 3:
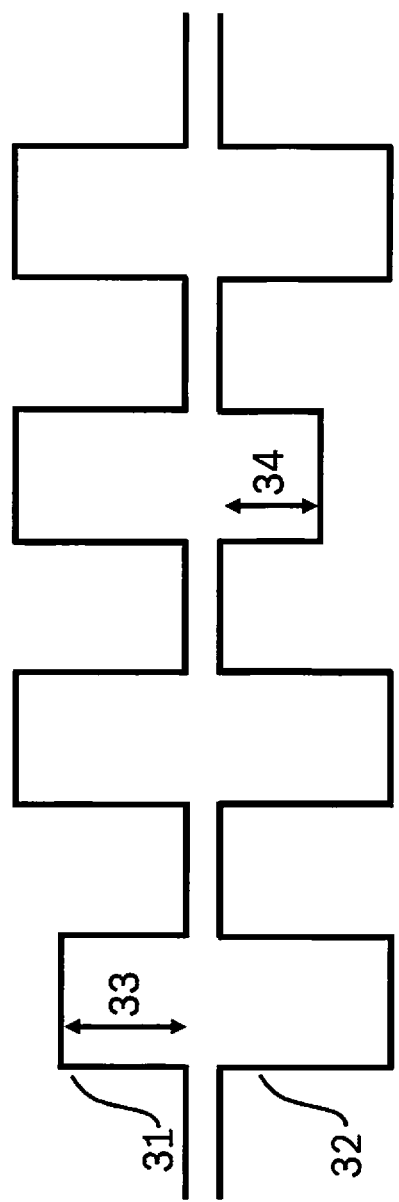
FIG. 3 shows an exemplary bit sequence having modified bit levels.

FIG. 3 shows a modified communication, again with a CAN high bit sequence 31 and a CAN low bit sequence 32. In comparison to the unmodified bit sequence from FIG. 2, however, here the voltage level for the transmitted bits is manipulated. For this purpose, it is possible to adapt the voltage level in a bit of the CAN high bit sequence (lowered voltage level 33 in a bit) or to adapt the voltage level of the CAN low bit sequence (lowered voltage level 34 in a bit) or to adapt the voltage level in bits of both bit sequences. The voltage level may be adapted in such a way that the differential signal of the bit sequences high and low remains unchanged, for example in that for the CAN high bit sequence both levels are increased by the same absolute value. It is also possible, however, for the voltage level of the differential signal to be affected by the modifications. The modifications represent characteristics, on the basis of which it is possible to assign the bits or bit sequences to network subscribers or transmission routes.

Figure 4:
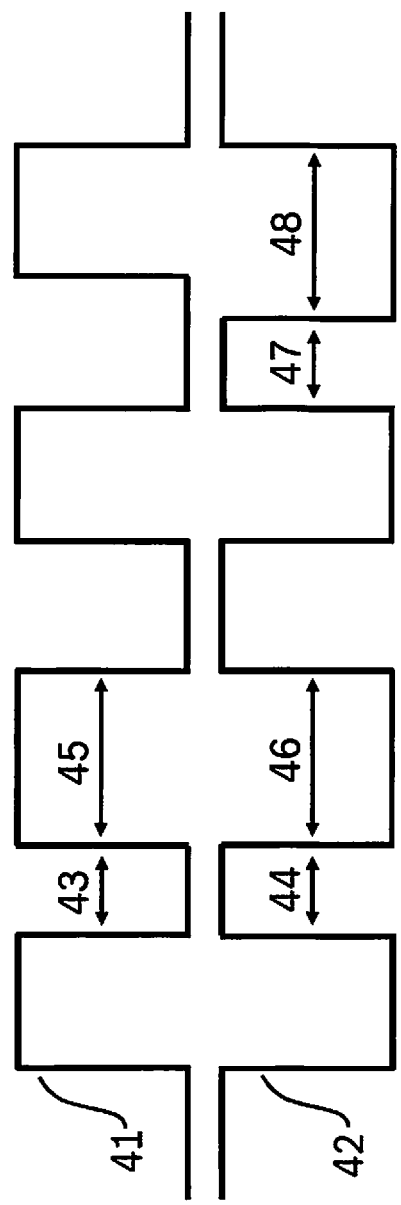
FIG. 4 shows an exemplary bit sequence having modified bit widths.

As another possible modification and thus as another characteristic, an extension or widening or a shortening or narrowing of bits of a bit sequence is shown in FIG. 4 (shown in a very pronounced manner for the purpose of illustration). This occurs in particular by modifying the transmission time of edges of the bits. Thus, for the CAN high bit sequence 41, bits are modified in their width (43, 45). For these bits, an respective modification is performed also for CAN low bit sequence 42 (modifications 44, 46). It is possible, however, that the modifications only affect one of the two bit sequences such as is the case e.g. in modifications 47 and 48 for CAN low bit sequence 42. Since the CAN signal is normally scanned at only one point in time of an edge, the edge must not be delayed beyond this point, for otherwise faulty scans will result. However, a delay e.g. in the range of 5% to 10% of an edge duration is within established CAN specifications. In terms of the modifications, naturally occurring jitter should also be taken in to account, which can additionally result in shifts of the edge times.

Figure 5:
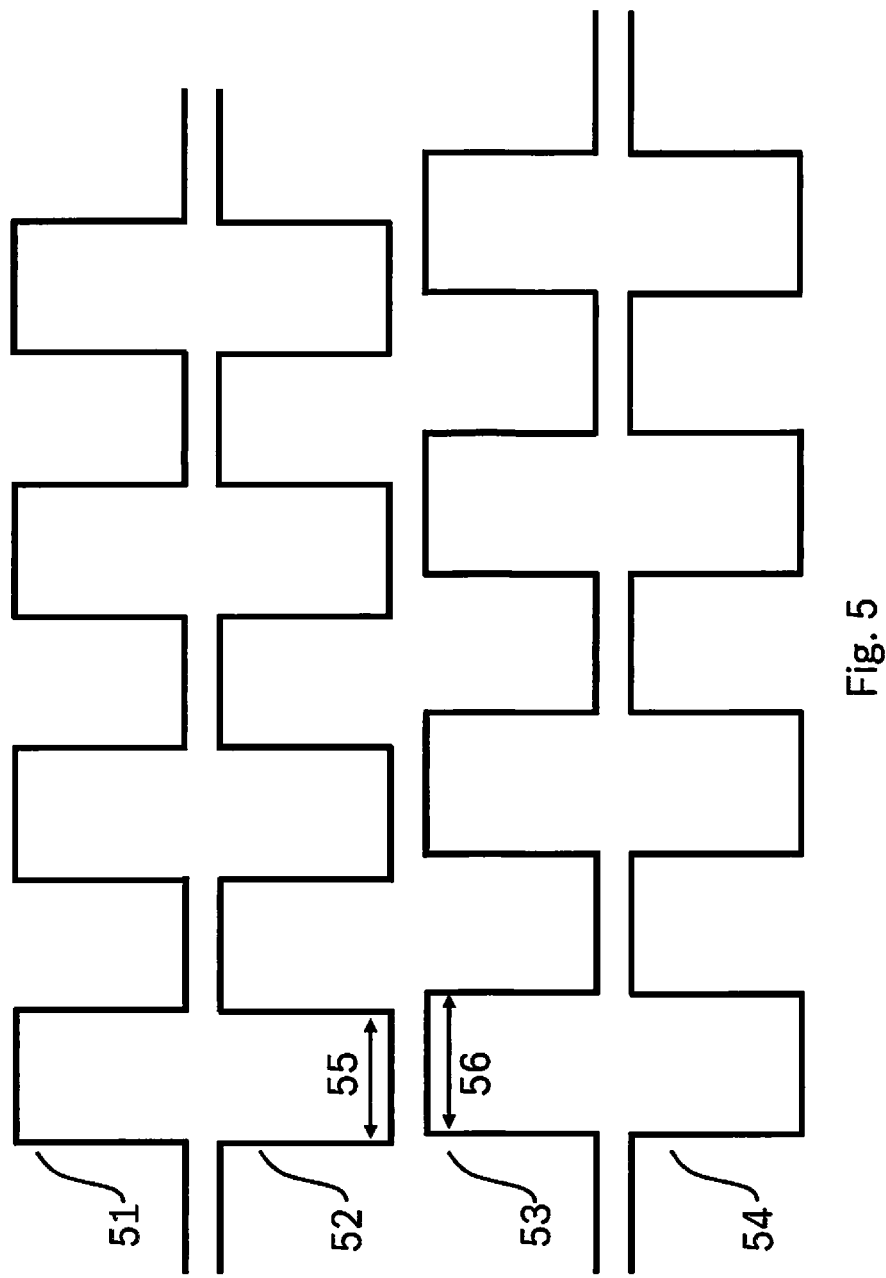
FIG. 5 shows an exemplary bit sequence having a modified clock-pulse rate.

In bit sequences 53 (CAN high) and 54 (CAN low) in FIG. 5, the clock-pulse rate was modified as a characteristic, that is, it was reduced in comparison to the likewise shown bit sequences 51 (CAN high) and 52 (CAN low). This results in a distortion of the entire bit sequences 53 and 54 vis-a-vis the unmodified bit sequences 51 and 52. Such speed changes should be within the admissible deviations according to the CAN specification. It is then possible, however, to use different clock-pulse rates as characteristics, a bit sequence having 100 kHz characterizing network subscriber 1 for example, 102 kHz characterizing network subscriber 2 and 104 kHz characterizing network subscriber 3. Aside from a modified clock-pulse rate (internal clock-pulse source in the network subscriber, in particular its communication controller), it is also possible to modify the baud rate of the transmission (generated by the network subscriber, in particular its communication controller). If a network subscriber has an input for external clock-pulse information, the latter may be used for the modifications. Modifications may thus be performed via an external clock pulse, an internal clock pulse, a baud rate or a combination of these.

Figure 6:
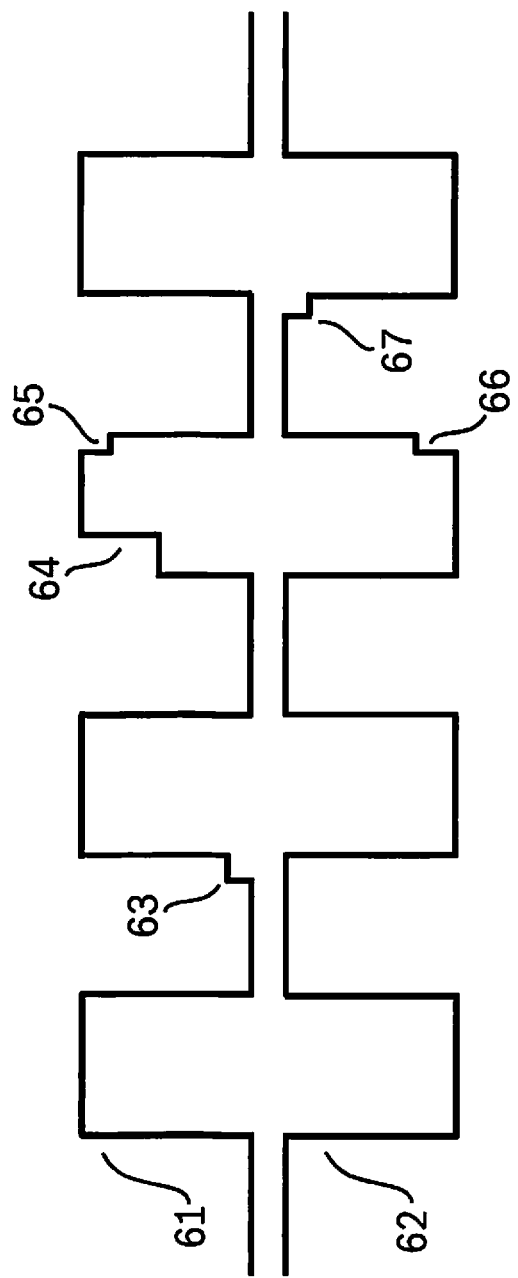
FIG. 6 shows an exemplary bit sequence having modified bit edges.

FIG. 6 shows bit sequences 61 (CAN high) and 62 (CAN low), in which the shape of individual bits was modified by stepped edges. Stepped edges occur, for example, when multiple transceivers attempt to transmit simultaneously, since multiple resistances add up during an edge duration. It is possible to make specific use of this effect. Particularly it is also possible to use specifically adapted output stages, for example transistors with additional hardware for generating edges. It is thus possible to add steps in front of a bit, e.g. step 63 for bit sequence 61 and step 67 for bit sequence 62, or remove steps from a bit, e.g. steps 64 and 65 for bit sequence 62 and step 66 for bit sequence 62. As shown, steps may be inserted into or removed from only one or both edges of a bit. In addition, a modification may be performed only in bit sequence 61, only in bit sequence 62 or in both bit sequences.

Alternatively, it is also possible to modify as a characteristic the duty cycle for the transmitted bit sequences or messages, that is, at what times and at what time intervals bit sequences or messages are transmitted in the network.

It is also possible to perform a combination of modifications. It is possible for example to modify the clock speed for a bit sequence and additionally to manipulate the bit width and to adapt the bit shape by steps. Here care must be taken, however, to ensure that the bit is still correctly recognized even in a combination of modifications.

Figure 7:
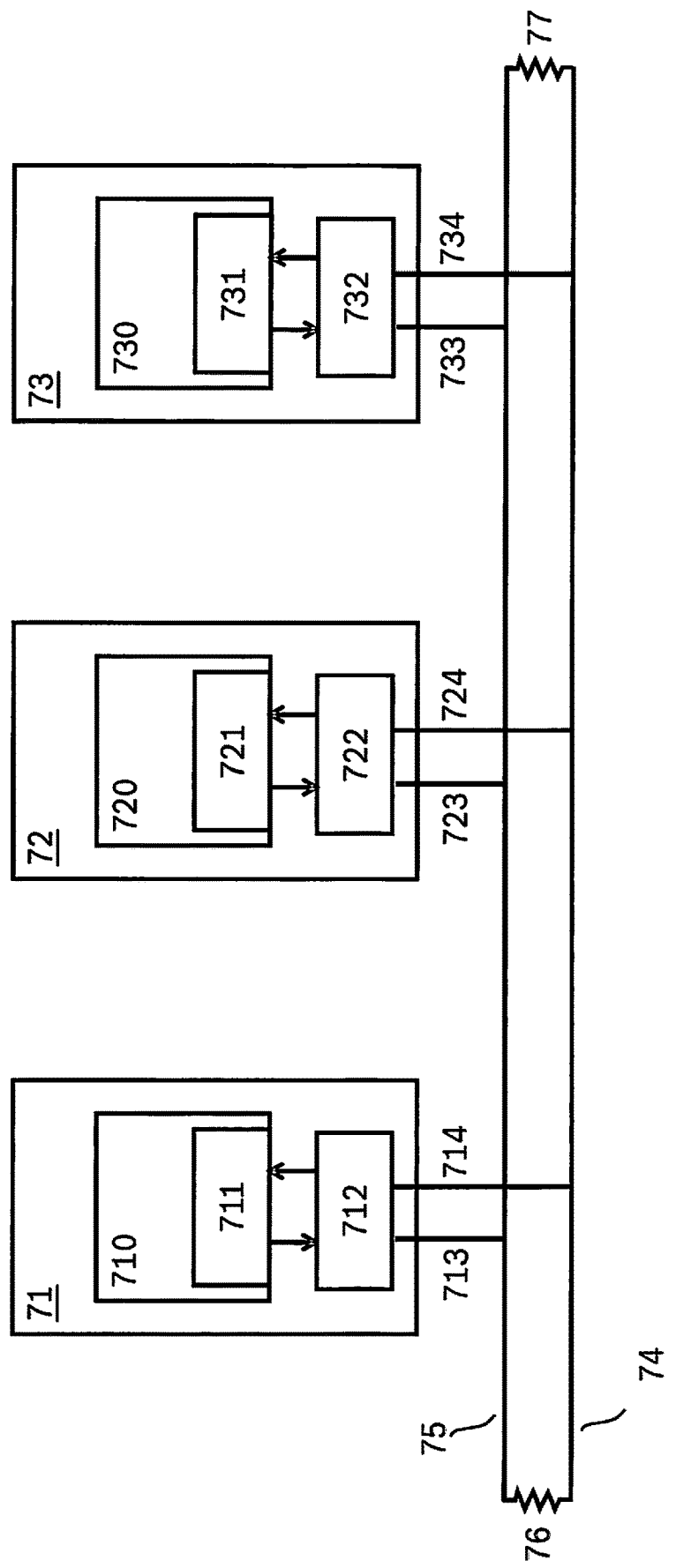
FIG. 7 shows a schematic structure of network subscribers in a network.

FIG. 7 shows exemplary network subscribers 71, 72 and 73, which have digital signal processors or microcontrollers 710, 720 and 730 as well as transceivers 712, 722 and 732, respectively. The signal processors or microcontrollers 710, 720 and 730 comprise communication controllers 711, 721 and 731, respectively, which are connected to the transceivers 712, 722 and 732, respectively, of the respective network subscriber. Transceivers 712, 722 and 732 connect the respective network subscriber via stub lines 713 (high), 714 (low) or 723 (high), 724 (low) and 733 (high), 734 (low) to the CAN high conductor 75 and CAN low conductor 74 of a CAN bus of the network. The CAN bus has resistors 76 and 77.

The modifications of the voltage levels, bits or bit sequences of transmitted messages may now be actively introduced into one or multiple of network subscribers 71, 72 and 73, in particular into their respective microcontrollers and signal processors (e.g. via software manipulation), into their communication controllers or their transceivers (e.g. via hardware selection or hardware manipulation). The modifications may also be introduced into the network subscribers via additional hardware. The modifications may also be implemented, however, by actively introduced properties of the stub lines, CAN high conductors and/or CAN low conductors or of resistors. Combinations of these variants are possible as well in order e.g. to be able to determine the origin of a message from a network subscriber and the involvement of a particular transmission route.

In an exemplary implementation, the bit stream to be transmitted is analyzed prior to a modification. For it is possible to perform more modifications, without these exceeding the specified limits for the transmission, if there are fewer consecutive bits of the same value. Thus e.g. a bit sequence of "1010101010" is ideal, while a bit sequence "00000111110000011111" offers fewer possibilities for modification. By analyzing the bit stream, it is therefore possible to adapt the characteristic modifications for the actually transmitted bit sequence and thus to apply them in a particularly efficient manner.

The implementation may be performed without additional hardware or without any hardware adaptations, e.g. by adapting the clock speed or baud rate in software. By additional hardware or suitable hardware adaptations, e.g. in a transceiver of a network subscriber, however, it is possible to introduce actively into the transmitted signal much more refined and meaningful modifications or characteristics. Accordingly, the configuration may be performed via software, e.g. via a register of a communication controller, into which a microcontroller of the network subscriber writes information. Additionally or alternatively, the configuration may also be performed via hardware, e.g. by hardware selection or by inserting an additional resistor or sensor. In a configuration via hardware, it is markedly more difficult for an external attacker to imitate or manipulate the modifications or characteristics. To prevent malicious reprogramming of a software configuration, it is possible for example to use an eFUSE technology.

The modifications or characteristics may be strictly defined for the network. Such an implementation is particularly simple to organize and set up. Alternatively, however, they may also be adapted flexibly (e.g. when the network is booted up or even during run time. Such an adaptation may be performed inside the network or by an external command. Such variability renders the method particularly secure against manipulation.

The configuration of the characteristics or modifications may occur manually or in automated fashion, deterministically or randomly, internally or externally. For the case of an automatic, random introduction of characteristics, the other network subscribers are able to learn their assignment by learning algorithms for example.

Figure 8:
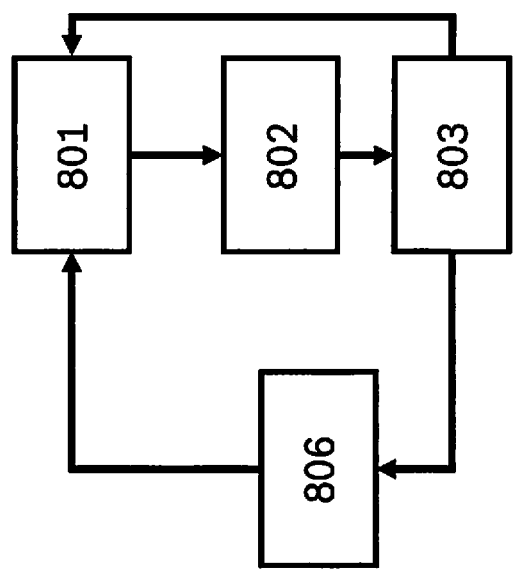
FIG. 8 shows a schematic sequence of an exemplary method for protecting a network against a cyberattack.

FIG. 8 schematically shows an exemplary sequence of a method for protecting a network against cyberattacks. In a first step 801, a message is transmitted in the network. For this purpose, a modification of the voltage levels, bits or bit sequences of the transmission is actively introduced in the transmitting network subscriber or in the transmission route as characteristics for the transmitting network subscriber or the utilized transmission route. In the second step 802, one or multiple network subscribers ascertain characteristics of the voltage levels, bits or bit sequences and ascertain the origin of the transmission by a comparison with stored assignments of characteristics regarding network subscribers or transmission paths. Subsequently, a determination is made in step 803 whether the transmitted message may be attributed to a cyberattack. The ascertained origin of the transmission may be used for this purpose. If no cyberattack is determined, the method branches again in step 801. If a cyberattack is determined, then the method branches in step 806, in which countermeasures or reactions are taken, which may be as a function of the origin of the message detected in step 802. In a particular development, the countermeasures or reactions are specifically adapted on the basis of the detected origin of the message.

As a reaction, it is possible to prevent further transmission (in particular in a real-time reaction) or at least further evaluation of a message, e.g. in that dominant signals are transmitted on a message channel (which render the message illegible or at least faulty, e.g. by overwriting a test sequence) or by transmitting an error frame directly following the message. It is also possible to configure these reactions as a function of where the message originated.

As a further countermeasure, it is possible, alternatively or additionally, to remove (in particular deactivate) (presumably) corrupted network subscribers from the network, in particular the network subscriber who was identified as transmitter of the message, or network subscribers from the network segment that was identified as source of the message. Likewise, it is possible to block transmission routes, via which the message was transmitted. Furthermore, it is also possible to block messages on gateways between specific networks or network segments in order to prevent an attack from crossing over into neighboring or additional networks or network segments.

It is possible, for example, to divide the network in a vehicle into logically and/or physically separated segments. For example, the network segment, to which a head unit of the vehicle is connected, may be separated by a gateway from another network segment, the additional network segment being used by safety-critical control units (e.g. for engine control, for ABS or EPS functions). If such a gateway, which separates two network segments, is identified via characteristics of the transmission or corresponding fingerprints as the source of a message in one of the segments, which an attacker is not able to manipulate via software, then it is possible to discard messages specifically from this gateway (and thus from the other network segment) or the gateway itself may be deactivated straightaway. This makes it possible to protect a safety-critical network segment from the effects of an attack on another network segment. Another countermeasure may also be switching off the supposed receiver of the message. Apart from a complete deactivation, it would also be possible to switch to an operating mode having reduced functionality, e.g. an emergency operating mode.

Finally, alternatively or additionally, it is also possible to transmit warning signals or error reports within the network or out of the network, which contain the detected attack and which may contain the ascertained origin.

Subsequently, the method may again branch from step 806 to step 801.

What is claimed is:

1. A method for protecting a network having multiple network subscribers against a cyberattack, the method comprising:
    analyzing bits or bit sequences of a message;
    determining, based on the analysis, characteristic modifications for transmitting the bits or bit sequences of the message; and
    after the determining, transmitting the bits or bit sequences of the message between the network subscribers in the network via different voltage levels on at least one transmission route of the network;
    wherein at least one characteristic of the voltage levels or of the transmitted bits or bit sequences is actively modified in at least one of the network subscribers or on the at least one transmission route, the origin of the transmitted bit or of the transmitted bit sequence is determined by the at least one network subscriber or the at least one transmission route based on the at least one characteristic, and the cyberattack is detected or the cyberattack on the network is localized in the network as a function of the ascertained origin; and
    wherein the active modification of the at least one characteristic uses the determined characteristic modifications.

2. The method of claim 1, wherein a magnitude of the voltage levels, a transmission time of at least one edge of the transmitted bit or the transmitted bit sequences or a shape of at least one edge of the transmitted bit, in particular by the insertion of steps in the at least one edge, is modified as the at least one characteristic.

3. The method of claim 1, wherein a clock speed or baud rate for the transmitted bits or bit sequences is modified as the at least one characteristic.

4. The method of claim 1, wherein a working cycle or rest cycle for the transmitted bits or bit sequences is modified as the at least one characteristic.

5. The method of claim 1, wherein the network is a CAN bus system.

6. The method of claim 1, wherein the network is a vehicle-internal network and the vehicle-internal point of attack of a cyberattack on the network is localized from outside the vehicle.

7. The method of claim 5, wherein the modification occurs only in the CAN high signal or only in the CAN low signal.

8. The method of claim 5, wherein the modification occurs in the CAN high signal and in the CAN low signal.

9. The method of claim 8, wherein the modification in the CAN high signal and in the CAN low signal is performed so that the differential CAN signal is not affected by the modifications.

10. The method of claim 7, wherein the modification is detectable in the differential CAN signal.

11. The method of claim 1, wherein the modification in the at least one network subscriber occurs in a communication controller of the network subscriber, in a transceiver of the network subscriber, in a microcontroller of the network subscriber or in a signal processor of the network subscriber.

12. The method of claim 1, wherein the network has a bus, which connects the network subscribers, in particular a CAN bus, and the modification occurs on the at least one transmission route on a stub line between the network subscriber and the bus, for a CAN bus in particular on a CAN high stub line and/or a CAN low stub line, or on the bus, for a CAN bus in particular on the CAN high conductor and/or the CAN low conductor.

13. The method of claim 1, wherein, in the event of a detected cyberattack, an error handling is performed, in particular a termination of the transmission of the message, an identification of the message as invalid, an exclusion of the localized point of attack from the network, a deactivation of a gateway of the network, in order to cut off a localized point of attack of the network from other parts of the network, or a transmission of a warning message about the detected manipulation.

14. The method of claim 12, wherein the error handling is performed specifically for a localized network subscriber, a localized network segment or for a localized transmission route of the network.

15. A device for protecting a network having multiple network subscribers against a cyberattack, comprising:
    a device configured to perform the following:
        analyzing bits or bit sequences of a message;
        determining, based on the analysis, characteristic modifications for transmitting the bits or bit sequences of the message; and
        after the determining, transmitting the bits or bit sequences of the message between the network subscribers in the network via different voltage levels on at least one transmission route of the network;

wherein at least one characteristic of the voltage levels or of the transmitted bits or bit sequences is actively modified in at least one of the network subscribers or on the at least one transmission route, the origin of the transmitted bit or of the transmitted bit sequence is determined by the at least one network subscriber or the at least one transmission route based on the at least one characteristic, and the cyberattack is detected or the cyberattack on the network is localized in the network as a function of the ascertained origin; and wherein the active modification of the at least one characteristic uses the determined characteristic modifications.

16. A non-transitory computer readable medium having a computer program, which is executable by a processor, comprising:

a program code arrangement having program code for protecting a network having multiple network subscribers against a cyberattack, by performing the following:
analyzing bits or bit sequences of a message;
determining, based on the analysis, characteristic modifications for transmitting the bits or bit sequences of the message; and
after the determining, transmitting the bits or bit sequences of the message between the network subscribers in the network via different voltage levels on at least one transmission route of the network;

wherein at least one characteristic of the voltage levels or of the transmitted bits or bit sequences is actively modified in at least one of the network subscribers or on the at least one transmission route, the origin of the transmitted bit or of the transmitted bit sequence is determined by the at least one network subscriber or the at least one transmission route based on the at least one characteristic, and the cyberattack is detected or the cyberattack on the network is localized in the network as a function of the ascertained origin; and wherein the active modification of the at least one characteristic uses the determined characteristic modifications.

17. The non-transitory computer readable medium of claim 16, wherein a magnitude of the voltage levels, a transmission time of at least one edge of the transmitted bit or the transmitted bit sequences or a shape of at least one edge of the transmitted bit, in particular by the insertion of steps in the at least one edge, is modified as the at least one characteristic.

* * * * *